United States Patent
Aster et al.

(10) Patent No.: US 8,996,769 B2
(45) Date of Patent: Mar. 31, 2015

(54) STORAGE MASTER NODE

(71) Applicant: NetApp, Inc., Sunnyvale, CA (US)

(72) Inventors: Radek Aster, Sunnyvale, CA (US); Mayank Saxena, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/960,695

(22) Filed: Aug. 6, 2013

(65) Prior Publication Data

US 2015/0046610 A1 Feb. 12, 2015

(51) Int. Cl.
| | |
|---|---|
| *G06F 3/00* | (2006.01) |
| *G06F 5/00* | (2006.01) |
| *G06F 13/00* | (2006.01) |
| *G06F 3/06* | (2006.01) |

(52) U.S. Cl.
CPC ............ *G06F 3/0653* (2013.01); *G06F 3/0604* (2013.01); *G06F 3/067* (2013.01)
USPC ................................. 710/74; 710/10; 710/19

(58) Field of Classification Search
None
See application file for complete search history.

(56) References Cited

U.S. PATENT DOCUMENTS

| | | |
|---|---|---|
| 7,120,690 B1 | 10/2006 | Krishnan et al. |
| 2005/0163133 A1 | 7/2005 | Hopkins |
| 2010/0245172 A1 | 9/2010 | Gottifredi et al. |
| 2012/0159021 A1* | 6/2012 | Anantha Padmanaban et al. ............................... 710/74 |
| 2012/0185553 A1 | 7/2012 | Nelson |

FOREIGN PATENT DOCUMENTS

EP    1477008 B1    12/2005

OTHER PUBLICATIONS

International Search Report and Written Opinion for International Application No. PCT/US2014/047292 mailed Oct. 31, 2014, 13 pages.

* cited by examiner

*Primary Examiner* — Zachary K Huson
(74) *Attorney, Agent, or Firm* — Perkins Coie LLP

(57) ABSTRACT

Technology is provided for selecting a master node of a node group in a storage system. The technology can gather data regarding visibility of one or more storage devices of the storage system to one or more active nodes of the node group, determine a maximum visibility value for the node group and selecting an active node with associated visibility value equal to the maximum visibility value as the master node of the node group.

28 Claims, 10 Drawing Sheets

| | |
|---|---|
| SYSID OF NODE | NODE #3 |
| TIME STAMP | 05/29/12 2:43:30 |
| ACTIVATE SMSS | 1 |
| DISK #1 | VISIBLE |
| DISK #2 | VISIBLE |
| DISK #3 | NOT VISIBLE |
| DISK #4 | VISIBLE |
| ⋮ | ⋮ |
| DISK #N | NOT VISIBLE |

*FIG. 7B*

|  | SYSID OF NODE = NODE #1 | SYSID OF NODE = NODE #3 | SYSID OF NODE = NODE #5 | ... | SYSID OF NODE = NODE #N |
|---|---|---|---|---|---|
| DISK #1 | 1 | 1 | 1 |  | 1 |
| DISK #2 | 1 | 1 | 1 |  | 0 |
| DISK #3 | 1 | 0 | 1 |  | 0 |
| DISK #4 | 1 | 1 | 1 |  | 0 |
| ⋮ | ⋮ | ⋮ | ⋮ | ⋮ | ⋮ |
| DISK #N | 0 | 0 | 1 |  | 1 |

*FIG. 7C*

STORAGE MASTER NODE

FIELD

This application generally relates to network storage systems and, more specifically, to a system and method for managing a cluster of storage controllers.

BACKGROUND

A storage controller can be used as a storage server to store, manage, and retrieve data from storage devices on behalf of one or more clients on a network. The storage devices can include, for example, magnetic or optical storage-based disks or tapes, or solid state devices. Some storage controllers are designed to service file-level requests from clients, as is commonly the case with file servers used in a network attached storage (NAS) environment. Other storage controllers are designed to service block-level requests from clients, as with storage controllers used in a storage area network (SAN) environment. Still other storage controllers are capable of servicing both file-level requests and block-level requests, as is the case with some storage controllers made by NetApp, Inc. of Sunnyvale, Calif.

As the workload complexity and throughput needs increase, a single storage controller maybe insufficient to manage the needs of the clients on the network. One solution to such a situation is to combine several storage controllers, also referred to as nodes, into a node group. One or more nodes and a group of storage devices (e.g., disks) assembled in a rack, or other similar enclosure, can be conventionally interconnected via a communication fabric to form an integrated storage system. To clients, such a storage system will still appear as a single server.

Internally, however, workload reaching the node group is distributed evenly among the node group members so that some nodes are not overwhelmed. In some storage systems, several node groups are created to handle different functions in the system, where each node group manages an associated group of storage devices. The group of storage devices, managed by an associated node group, is also referred to as a shared storage group ("SSG"). For example, in a storage system with multiple node groups, one node group may be responsible for managing the needs of a particular set of clients while another node group may handle the needs of other clients. Although such flexible node group configurations are beneficial as they allow highly efficient resource allocation, they can be difficult to administer.

A network administrator typically configures at least one node in a node group to be a master node. In general, the master node takes "ownership" of the SSG associated with the node group and is responsible for performing various SSG management related tasks. Thus, in addition to performing the same duties as the other nodes in the node group, the master node is responsible for managing the SSG. Typically, the master node is selected by the nodes of the node group using a complex arbitration scheme or is manually selected by a network administer.

Although the network administrator may use various criteria to select a master node, master nodes are typically selected based on availability. Availability refers to a node's capacity to provide continuous access to storage network resources, even when serious network failures occur. Thus, the network administrator is often faced with the task of finding the most highly available node in the node group to select as the node group's master node. Finding the most highly available nodes in possibly overlapping node groups may be difficult to do and may require the network administrator to use time-consuming trial and error techniques.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

The techniques introduced here may be better understood by referring to the following Detailed Description in conjunction with the accompanying drawings, in which like reference numerals indicate identical or functionally similar elements:

FIG. 7B is a map diagram illustrating an example of a visibility map, consistent with various embodiments.

FIG. 7C is a map diagram illustrating an example of an aggregate visibility map, consistent with various embodiments.

DETAILED DESCRIPTION

Technology is disclosed for selecting a master node of a node group in a storage system ("the technology"). In various embodiments, the technology gathers data regarding visibility of one or more storage devices of the storage system to one or more active nodes of the node group, wherein a particular storage device is visible to a particular active node when the particular storage device remains accessible to the particular active node through at least one functioning path in the storage system. A node of the node group is considered an active node when the node is functioning and servicing storage related requests. A functioning path includes any working data communication pathway that can transfer data between components attached to the pathway.

In various embodiments, the technology determines a maximum visibility value for the node group, wherein the maximum visibility value is determined as a function of a highest visibility value of one or more visibility values corresponding to the one or more active nodes. Further, the visibility value of the particular active node is determined as a function of a total number of storage devices visible to the particular active node. In various embodiments, the visibility of the given node can be defined in terms of various parameters, such as visibility of storage shelves, that are directly or indirectly related to the accessibility of the one or more storage devices that are directly or indirectly associated with the given node. In various embodiments, the technology selects as the master node of the node group an active node with an associated visibility value equal to the maximum visibility value.

The foregoing and other features, utilities and advantages of the invention will be apparent from the following more particular description of various embodiments of the invention as illustrated in the accompanying drawings. Note that references in this specification to "an embodiment," "one embodiment," or the like mean that the particular feature, structure, or characteristic being described is included in at least one embodiment of the invention. Occurrences of such phrases in this specification do not necessarily all refer to the same embodiment.

Figure 1:
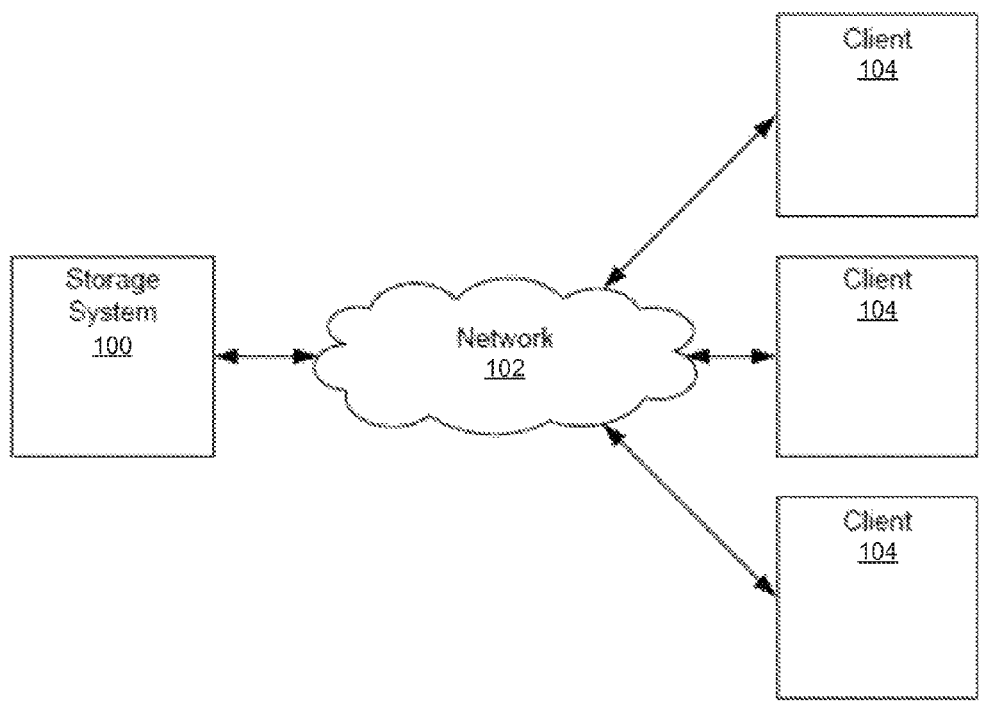
FIG. 1 is a block diagram illustrating an environment in a storage system which may operate in various embodiments.

Turning now to the Figures, FIG. 1 is a block diagram illustrating an environment in a storage system which may operate in various embodiments. According to the embodiment illustrated in FIG. 1, a storage system 100 is coupled to multiple clients 104 via a network 102. Network 102 can be, in various embodiments, the Internet, a private corporate network or intranet, a storage area network ("SAN"), a local area network ("LAN"), a wide area network ("WAN"), or indeed any other type of a data communication network. In various embodiments, storage system 100 can be a network-attached storage ("NAS") system. During operation, clients 104 can transmit commands to storage system 100 to read or write data, and the storage controllers and storage devices of storage system 100 operate to respond to the commands. In various embodiments, storage system 100 can also perform other storage-related tasks.

Figure 2:
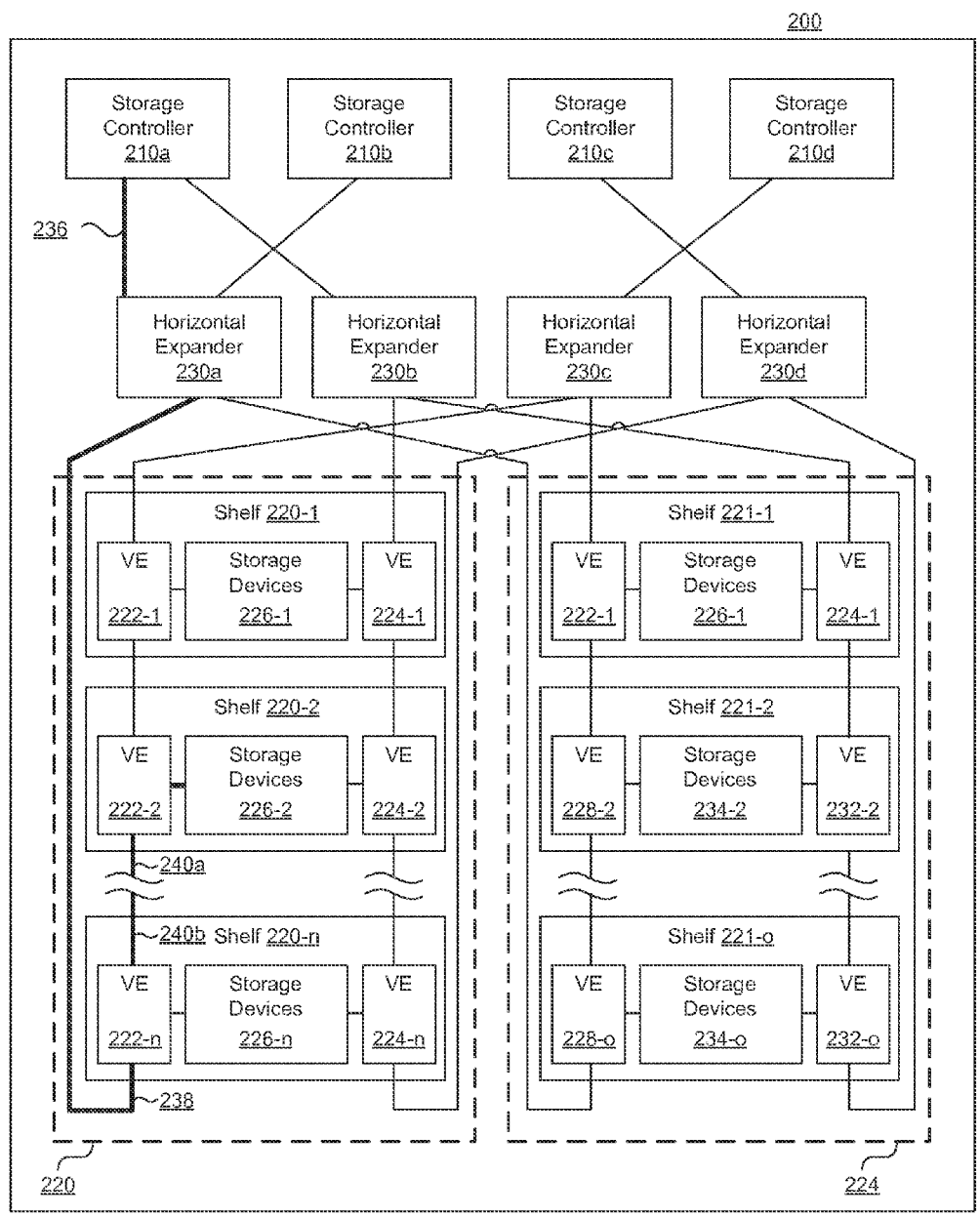
FIG. 2 is a block diagram illustrating a storage system including a group of storage controllers and a group of storage subsystems, each with a group of shelves of storage devices consistent with various embodiments.

FIG. 2 is a block diagram illustrating a storage system including a group of storage controllers and a group of storage subsystems, each with a group of shelves of storage devices consistent with various embodiments. Storage system 200 may correspond, in some embodiments, to storage system 100 depicted in FIG. 1. Storage system 200 includes storage controllers 210a, 210b, 210c, 210d, a group of n shelves 220, of which three shelves (220-1, 220-2, and 220-n) are depicted, and a group of o shelves 221, of which three shelves (221-1, 221-2, and 221-n) are illustrated in FIG. 2. Each group of shelves 220 and 221 is also referred to as a "stack," or a "storage subsystem," where each group of shelves 220 and 221 includes a group of storage devices. In the illustrated embodiment, shelves 220 includes storage devices 226 and shelves 221 include storage devices 234. In some embodiments, the group of shelves 220 substantially corresponds to the group of shelves 221 in terms of the subcomponents (or devices), the shelves comprise. However, in some embodiments, the number n of shelves 220 is different than the number o of shelves 221. Although three shelves are depicted, and n (or o) shelves are considered in the discussion below, the techniques introduced here can be implemented with as few as one shelf, such as shelf 220-1, or numerous shelves.

The storage system 200 can also include horizontal expanders 230a, 230b, 230c, and 230d that are coupled amongst storage controllers 210a, 210b, 210c and 210d, and shelves 220-1 through 220-n and shelves 221-1 through 221-o as illustrated in FIG. 2. The horizontal expanders and vertical expanders (discussed in detail below) can all be direct-attach storage expanders. Direct-attach storage expanders are interposed between a direct-attach storage device and a storage controller to allow for various simple interconnect topologies. Typically, direct-attach storage expanders operate as routers for routing frames amongst topology endpoints. Note that descriptions here of an expander being a "horizontal" or "vertical" expander do not imply physical orientation. Each horizontal or vertical expander is, in various embodiments, a Serial-Attached SCSI ("Small Computer System Interface") expander, a "SAS" expander, or other type of expander.

Shelf 220-1, at the "top" of the stack of n shelves 220, is illustrated in FIG. 2 as including a pair of vertical expanders 222-1 and 224-1, as well as a group of storage devices 226-1. Note that descriptions here of a shelf being at the "top" or "bottom" of a stack do not imply physical positioning, but are merely used as guides for understanding the drawings. Vertical expanders 222-1 and 224-1 are coupled to horizontal expanders 230c and 230b, respectively. At the "bottom" of the stack of n shelves 220, shelf 220-n includes a pair of vertical expanders 222-n and 224-n, as well as a group of storage devices 226-n.

Further, vertical expanders 222-n and 224-n are coupled to horizontal expanders 230a and 230d, respectively. As such, only the top and bottom shelves, i.e. shelves 220-1 and 220-n, are coupled to the horizontal expanders of storage system 200. In contrast, shelves between the "top" and "bottom" shelves, e.g. shelf 220-2, are coupled instead to adjacent shelves. For example, vertical expander 222-2 is coupled to vertical expander 222-1 and to a first vertical expander of the next lower shelf (not illustrated). Similarly, vertical expander 224-2 is coupled to vertical expander 224-1 and to a second vertical expander of the next lower shelf. Configured in this manner, the shelves 220 in the stack of n shelves 220 are "daisy-chained" together.

In storage system 200, utilizing the vertical expanders 228-1 through 228-o and 232-1 through 232-o, the upward and downward routing in shelves 221-1 through 221-o work in a similar manner corresponding to that of shelves 220-1 through 220-n. Further, vertical expanders 228-1 and 232-1 are coupled to horizontal expanders 230c and 230b, respectively. At the "bottom" of the stack of o shelves 221, shelf 221-0 includes a pair of vertical expanders 228-o and 232-o, as well as a group of storage devices 234-0. Vertical expanders 228-o and 232-o are coupled to horizontal expanders 230a and 230d, respectively. Accordingly, only the top and bottom shelves, e.g., shelves 221-1 and 221-o, are coupled to the horizontal expanders of storage system 200.

Each of the couplings referred to above is, for example, a physical cable link, a passive backplane link, or another suitable data communication link ("link"). Generally, a link is a facility for data communications and has a physical attribute. Various data communications links can be selected, e.g., for speed and/or distance. A path through a data communications fabric of storage system 200 includes a group of couplings (e.g., "links") and expanders between the storage controllers 210a-210d and one of storage devices 226, 234, where a data communication fabric provides for a transfer of data between the different components or devices attached to the fabric. For example, a path between storage controller 210a and storage devices 226-2 includes coupling 236, 536, horizontal expander 230a, coupling 238, vertical expander 222-n, one or more vertical expanders in the stack of n shelves 220 between vertical expanders 222-n and 222-2, vertical expander 222-2, and all intermediate couplings 240a and 240b between vertical expanders 222-n and 222-2. Such a path is illustrated in FIG. 2 with bold lines. Another path between storage controller 210a and storage devices 226-2 includes horizontal expander 230b, vertical expander 224-1, vertical expander 224-2, and all intermediate couplings between the identified horizontal and vertical expanders. There are thus multiple paths between all endpoints (e.g., storage controllers and storage devices) in storage system 200.

In various embodiments, the storage subsystems 220, 221 together form a shared storage group ("SSG") in the storage system 200, where the storage controllers 210a, 210b, 210c, 210d together form a node group associated with the SSG. Note that in other embodiments, storage system 200 can include additional storage controllers, storage subsystems, and expanders, which can together form additional SSGs and associated node groups. In various embodiments the storage system 200, in, includes a quorum membership manager ("QMM") configured to determine which nodes (e.g., storage controllers) are associated with which SSG and to determine which nodes in each node group are active and which ones are inactive (e.g., because they are failed or booting). In various embodiments, the QMM is implemented in one or more nodes. In other embodiments, the QMM is implemented in a cluster network node that manages the various nodes in the storage system 200 which are associated with the SSGs.

In various embodiments, the QMM determines the node groups associated with each SSG by identifying the storage devices that are managed by each node, where the nodes that together manage at least one storage device of an SSG are included in the node group associated with the SSG. Further, utilizing the information regarding the nodes that belong to each node group, the QMM in various embodiments informs the nodes in a node group when one of the nodes of the node group leaves (e.g., becomes inactive) or when one of the nodes of the node group joins (or rejoins) the node group (e.g., becomes active). As discussed in further detail below, such information can be used by the other nodes of the node group to select a new master node.

In the master node selection process storage system 200 implements visibility of the various storage devices 226 and 234 within the SSG to the nodes 210a-210d, which jointly manage the SSG as a node group, is utilized to determine the master node of the node group. In the master node selection process, the visibility of a storage device 226 or 234 to a node 210a-210d is determined based on the presence of a data communication path between the storage device and the node.

For example, as discussed above, node 210a has multiple paths to access and manage the storage devices 226-2. However, if the coupling 236 and the vertical expander 224-2 both fail, the node 210a will have no functioning path to the storage devices 226-2, limiting its ability to access and manage the storage devices 226-2. On the other hand, node 210b still has visibility to the storage devices 226-2 through the horizontal expander 230a and the rest of the path illustrated in FIG. 2 with bold lines, allowing it to access and manage the storage devices 226-2. As will be discussed in further detail later, in various embodiments the selection process selects as the master node one of the nodes 210a-210d with a functioning path (e.g., visibility) to the most number of storage devices 226 and 234 within the SSG.

Having thus described storage system 200 illustrated in FIG. 2, discussion turns now to components associated with storage controllers and shelves. FIG. 3 is a block diagram of a storage controller consistent with various embodiments. Storage controller 310 (also referred to herein as a "node") corresponds to the storage controllers 210a-210d of FIG. 2 and illustrates greater detail. Similarly, shelf 320 corresponds to any of shelves 220-1 through 220-n and 221-1 through 221-o of FIG. 2 and illustrates greater detail.

Storage controller 310 can include processor 342 and memory 344 coupled to PCIe switches 361 and 362. Processor 342 may be configured to execute instructions, stored in memory 344, for operating storage controller 310 according to the technology described herein. In various embodiments, processor 342 may be configured instead as specially designed hardware, such as an application-specific integrated circuit. Processor 342 can affect operation by sending commands and data via PCIe switches 361 and 362, which can be, for example, components of a PCI-e system.

Figure 3A:
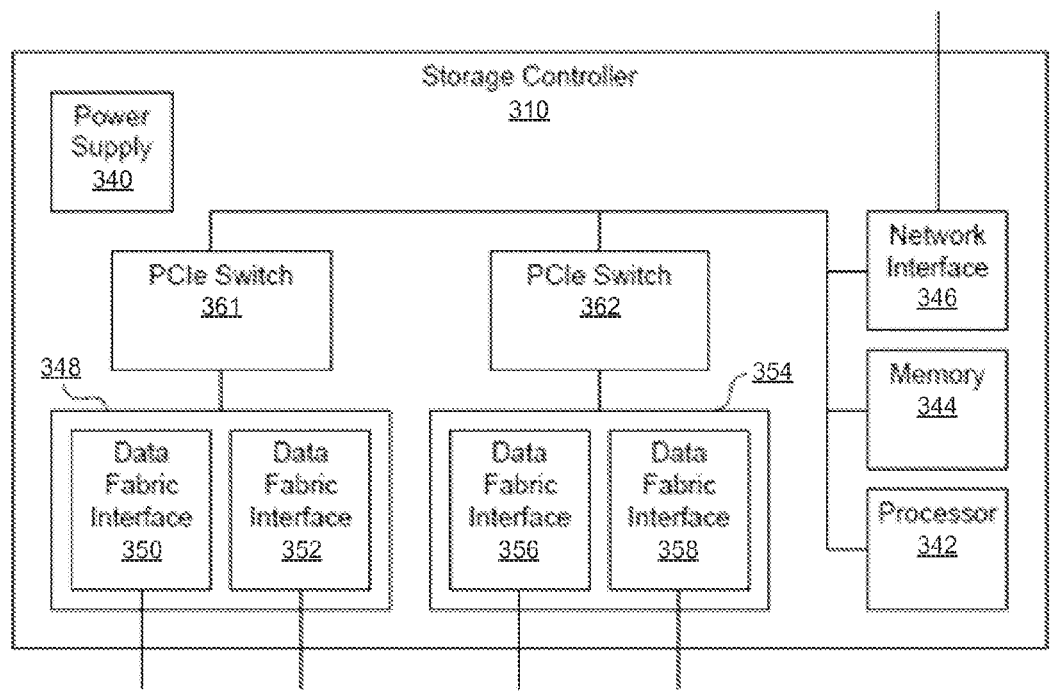
FIG. 3A is a block diagram of a storage controller consistent with various embodiments.

In various embodiments, PCIe switches 361 and 362 can be replaced by, for example, a shared conductor bus, a backplane, or another kind of data communications technology. Power for processor 342 and other components can be provided by power supply 340. Storage controller 310 also includes network interface 346 coupled to processor 342 and memory 344. Network interface 346, can be implemented as, for example, an Ethernet interface, configured to communicate via a network, e.g., network 102 depicted in FIG. 1, to clients of a storage system, e.g., clients 104. Further, storage controller 310 includes communication interfaces 350, 352, 356, and 358 for communicating with a set of horizontal expanders, such as horizontal expanders 230a, 230b, 230c, and 230d depicted in FIG. 2. Communication interfaces 350, 352, 356, and 358 of storage controller 310 are, in various embodiments, implemented on two physically separate host bus adaptors ("HBAs"). These are depicted in FIG. 3a as HBA 348 and HBA 354.

Figure 3B:
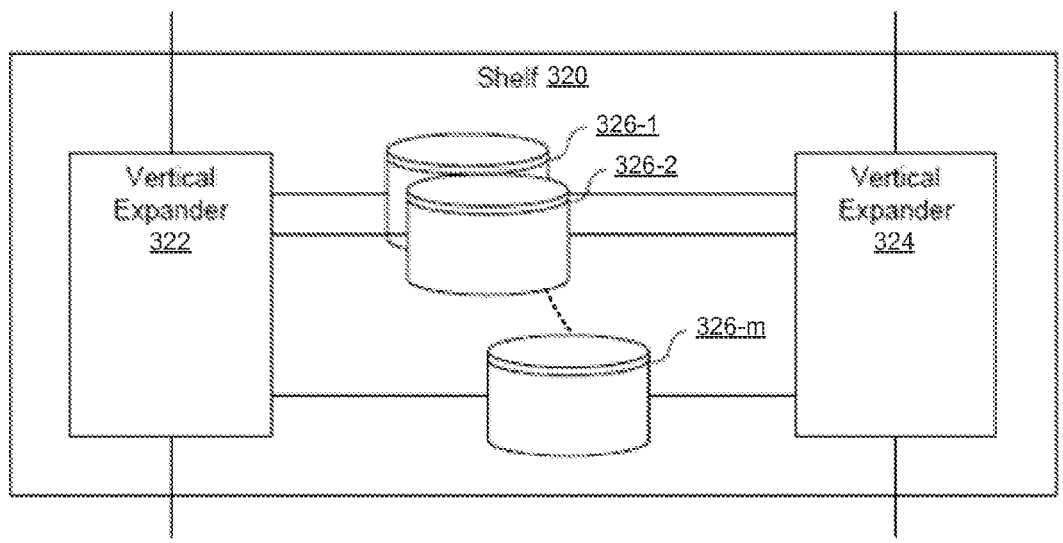
FIG. 3B is a block diagram illustrating connectivity between storage devices and multiple vertical expanders.

FIG. 3b is a block diagram of storage devices consistent with various embodiments. Shelf 320 can include vertical expanders 322 and 324, as well as m storage devices 326-1 through 326-m. Although three storage devices are depicted, and m storage devices are considered in this discussion, the techniques introduced here can be implemented with as few as one storage device in a given shelf. In some embodiments, shelf 320 includes a passive backplane configured to accept vertical expanders 322 and 324 as well as m storage devices. In some embodiments, vertical expanders 322 and 324 are SCSI Attached Storage ("SAS expanders"). SAS expanders have a group of ports for connecting to SAS initiators, SAS targets, or another SAS expander. In various embodiments, shelf-to-shelf connections from vertical expanders 322 and 324 to adjacent shelves can be "wide port" connections utilizing multiple physical links. In various embodiments, connections to storage devices 326-1 through 326-m can be standard connections (i.e., not wide connections) utilizing a single physical link. Other connections can be employed between adjacent shelves and/or storage devices.

Storage devices 326-1 through 326-m can be hard disk drives, e.g. a magnetic-storage hard disk drive, other forms of magnetic or optical mass data storage, or flash memory or another form of nonvolatile solid-state memory (e.g., solid state drives). In some embodiments, storage devices 326-1 through 326-m are "dual-ported" SAS drives. Dual-ported SAS drives have a pair of ports, e.g., for connecting to a SAS initiator or a SAS expander. As illustrated in FIG. 3b, each of storage devices 326-1 through 326-m can be connected both to vertical expander 322 and to vertical expander 324, e.g., by using both of the storage device's ports.

Master node selection technique implemented in the storage system 200. As discussed above, within each node group in the storage system 200 and its associated SSG, only the master node may be permitted to perform some tasks, e.g., generating a support request in the event of a shelf failure within the SSG; generating a support request in the event of a storage device failure within the SSG; updating firmware required by the SSG; retrieving event logs generated within the SSG; etc. In the storage system 200, when a node group 210 receives a request to perform a task (e.g., a service request to update a firmware of the SSG), the nodes 210a-210d associated with the node group 210 determine if the requested task is one of the tasks handled by the master node. Each of the nodes 210a-210d then determines if it is the master node. The node that identifies itself as the master node then performs the requested task.

Figure 4:
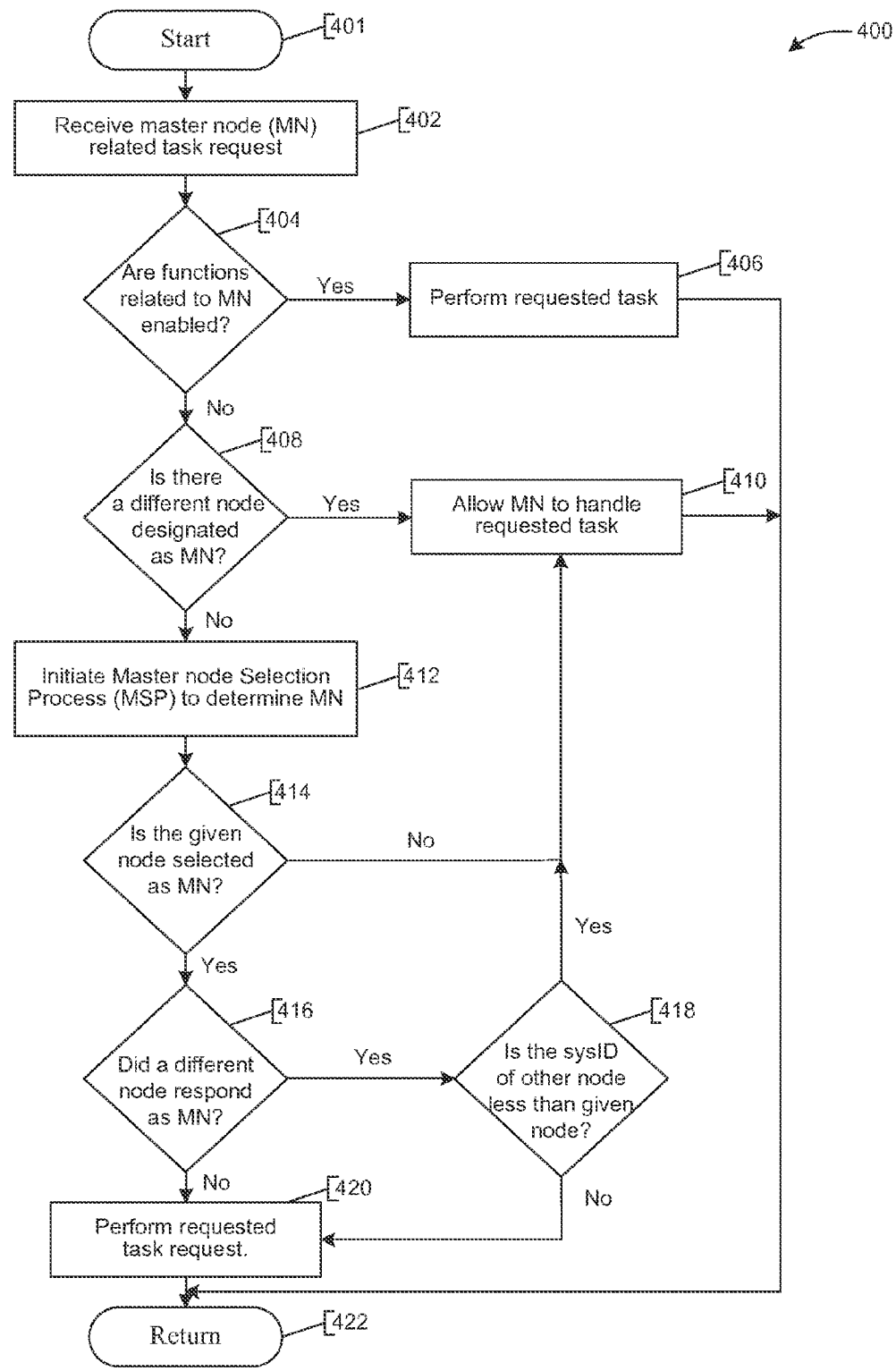
FIG. 4 is a flow diagram illustrating a process implemented by the nodes of a node group in the storage system to handle a task required to be performed by a master node of the node group, consistent with various embodiments.

FIG. 4 is a flow diagram illustrating a process implemented by the nodes of a node group in the storage system to handle a task required to be performed by a master node of the node group, consistent with various embodiments. The process 400, including steps 402 through 420, can be implemented by a node of a node group 210 in the storage system 200 when a task is to be performed by the master node of the node group 210. In various embodiments, the process 400 is implemented in each of the nodes 210a-210d of the node group 210. This description discusses the operations from the perspective of one of the nodes (herein referred to as the "given node") of the node group 210. It is understood that these operations are applicable to any node within the node group and the description from the perspective of the "given node" herein is provided primarily for illustrative purposes. The process 400 begins at block 401. At block 402, the given node receives information regarding the task to be performed by the master node of the node group 210. For purposes of illustration, such a task to be performed by the master node may include, for example, a service request for replacing failed storage devices.

At decision block 404, the given node determines whether it is acting as the master node ("MN" in FIG. 4) of the node group 210. In various embodiments, the given node can determine whether it is acting as the master node by determining whether particular functionalities associated with a master node are enabled or disabled in the given node. For example, functionalities utilized for replacing failed storage devices are disabled when the given node is not acting as the master node of the node group. So, by determining whether one or more such functionalities is enabled or disabled, the given node can determine whether it is currently the master node of the node group 210. If functionalities associated with a master node are enabled, the process 400 continues at block 406. Otherwise, the process 400 continues at decision block 408. The given node performs the requested task. The process 400 then returns at block 422.

If the process 400 determines at block 404 that the given node is not the master node, it proceeds to decision block 408, where the given node determines whether a different node within the node group 210 is designated as the master node. In various embodiments, the given node can determine if a different node is acting as the master node based on a previously received response from a different node of the node group 210, e.g., indicating that the other node is designated as the master node of the node group. As discussed in further detail below, when a node within a node group 210 determines that it should act as the master node of the node group 210, the node informs the other nodes of the node group 210 that it is acting as the master node. If a different node is acting as the master node, the process 400 continues at block 410. Otherwise, the process continues at block 412. At block 410, the process allows the other node of the node group 210, which is designated as the master node of the node group, to perform the requested task. The process 400 then returns at block 422.

At block 412, the given node initiates a master node selection process to determine if the given node should act as the master node. The master node selection process is described in further detail below in relation to Figures. In various embodiments, the master node selection process enables "master node" functionalities in the given node when the given node is determined to be the master node. For example, when the given node is determined as the master node, functionalities utilized for filing a service request for replacing failed storage devices are enabled.

The process 400 then continues at decision block 414, where the process 400 determines if the master node selection process designated the given node to be the master node. As discussed above, in various embodiments, the given node can determine if it is designated as the master node by checking whether functionalities associated with the master node have been enabled. When the given node is not designated as the master node, the given node allows the other node (e.g., actually designated as the master node.) of the node group to perform the requested task by continuing at block 410. If the given node is designated as the master node, the process 400 continues at decision block 416.

At decision block 416, the given node determines if it received a response from any of the other nodes of the node group 210 indicating that at least one of the other nodes is also designated as the master node of the node group 210. In some instances, two or more nodes may contend to act as the master node for the node group 210. This may happen for various reasons, e.g., due to an error in the data utilized by at least some of the nodes of the node group 210 when performing the master node selection process. At step 420, when none of the other nodes of the node group 210 respond as acting as the master node in step 416, the given node performs the received task.

If at decision block 416 the process 400 determines that there are two or more contenders for master node, the process 400 continues at decision block 418. At decision block 418, the given node determines whether a pre-assigned node identification number (also referred to as the system ID or simply sysID) associated with the given node is less than the sysID corresponding to the one or more other contending nodes. In various embodiments, each node of the storage system 200 is assigned a sysID by the network administrator, which the node stores in its configuration file. The sysID, for example, is a numerical value that can be compared against other sysIDs using inequality functions. If the sysID of the other node is less than the given node, the process 400 continues at block 410. Otherwise, the process 400 continues at block 420. In various embodiments, other or additional conflict resolution methods can be employed.

At block 420, for example, when none of other nodes has a sysID that is less than that of the given node, the given node is designated as the master node and performs the received task. When at least one of the other nodes has a sysID that is less than that of the given node, the given node causes that other node to be designated the master node and allows the designated master node to perform the requested task. For example, if node 210a and node 210b are both contending to be the master node of the node group 210 and node 210a is assigned sysID "1" and node 210c is assigned sysID "4", are because node 210a has the least sysID then node 210a will be designated as the master node. The process 400 then returns at block 422.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5:
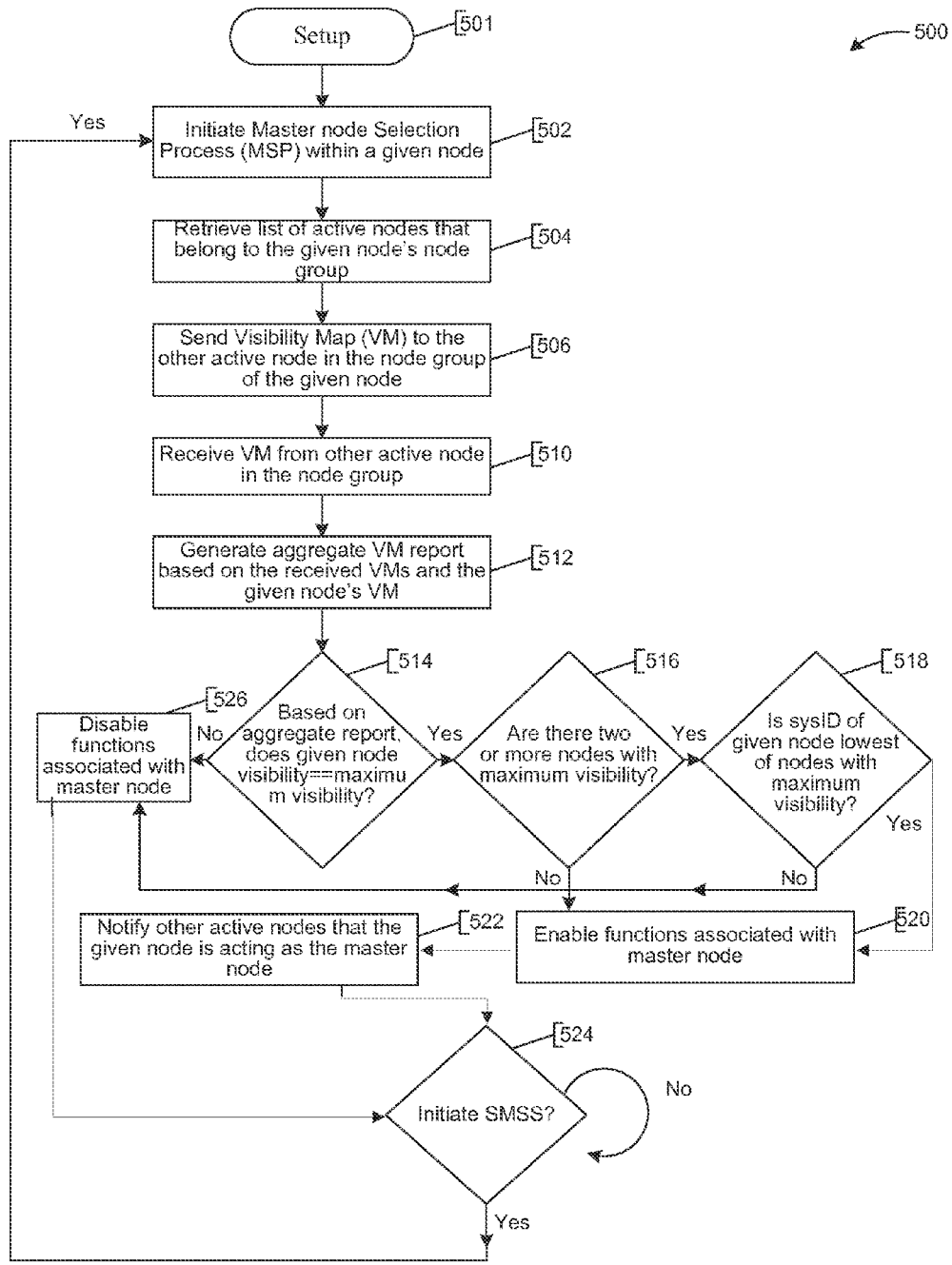
FIG. 5 is a flow diagram illustrating a master node selection process implemented by the nodes of a node group to determine the master node of the node group, consistent with various embodiments.

FIG. 5 is a flow diagram illustrating a master node selection process implemented by the nodes of a node group to determine the master node of the node group, consistent with various embodiments. The selection process 500 can also be referred to as the master node selection process. The process 500 can employ the respective visibility of the various storage devices (e.g., of the SSG) to the storage nodes (e.g., associated with that SSG) to identify the master node of the node group number. In the selection process 500, the node with functioning paths ("visibility") to the most number of storage devices within the SSG is chosen as the master node. Further, by implementing the master node selection process 500 in each nodes of the node group, each node can independently analyze the visibility of all the nodes in the node group and determine which node is to be designated as the master node. Such a process does not require any complex arbitration schemes amongst the nodes of the node group to determine their master node.

In various embodiments, the process 500 is implemented in each of the nodes 210a-210d of the node group 210. For purposes of illustration, the following discussion focuses on the operations from the perspective of one of the nodes (herein referred to as the "given node"). In this illustration, process 500 is implemented by a given node of a node group in the storage system 200 to determine if the given node should be designated as the master node of the node group. The process 500 begins at block 501. At block 502, the given node initiates the master node selection process (hereinafter referred to as the "MSP") to determine if the given node should act as the master node of the node group 210.

Figure 7A:
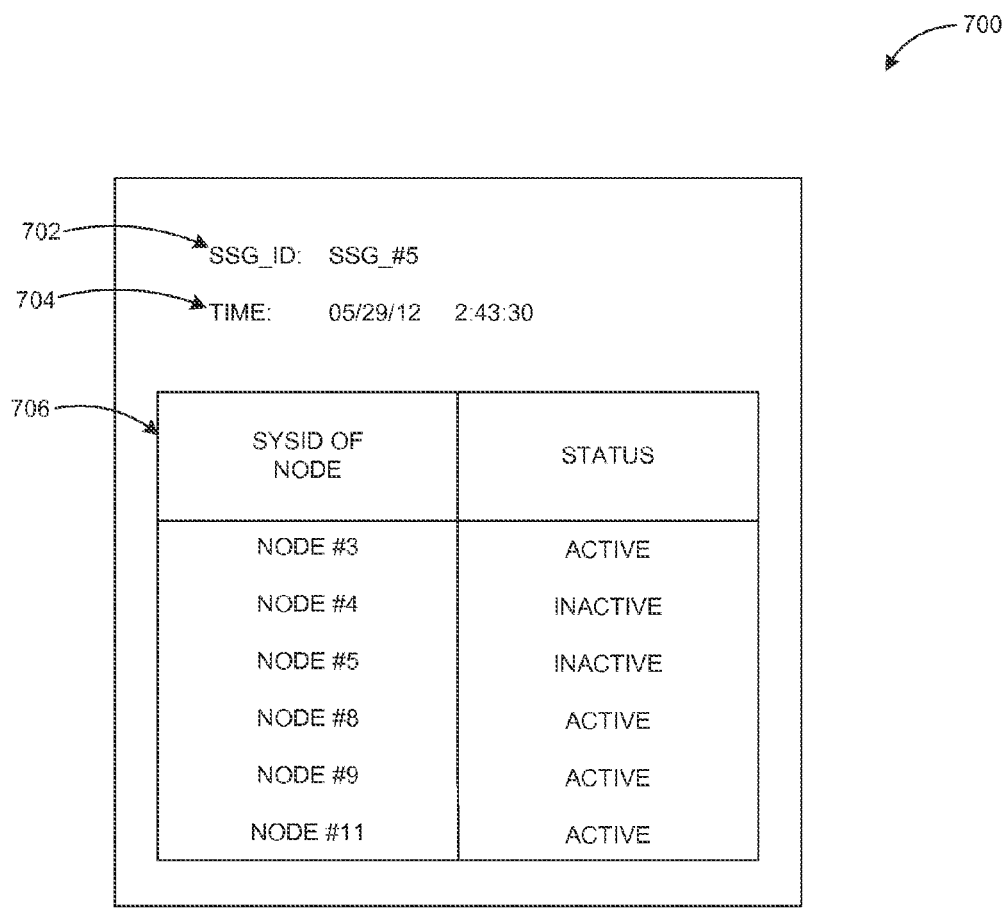
FIG. 7A is a report diagram illustrating an example of a report provided by the quorum membership manager, which includes the list of nodes of a node group and the status of the nodes (i.e. active or inactive) at the time of generation of the report, consistent with various embodiments.

At step 504, the given node retrieves a list of active nodes that belong to the given node's node group. In various embodiments, the given node queries the QMM to determine the nodes 210a-210d that belong to the node group 210 and the activity status of the nodes 210a-210d that belong to the node group 210. As discussed above, the QMM determines the nodes that are associated with a node group based on the storage devices managed by the nodes. Turning briefly to FIG. 7A, FIG. 7A illustrates an example of a report 700 generated by a QMM of a list of nodes 706 of a node group and the status of the nodes 706 (e.g., active or inactive) at the time indicated by the timestamp 704, where the node group is associated with SSG "SSG_#5" 702. That the report 700 is merely provided as an example to illustrate the kinds of information that can be included in the report 700 and is not meant to limit the information that could be included in the report 700 or the format such information could be presented in.

Returning now to Figures, at block 506, the given node sends its visibility map to the active nodes of the node group 210 determined in step 504. The visibility map can include a list of storage devices 226 and 234 within the SSG (associated with the node group 210) and the visibility of the storage devices 226, 234 to the given node. As discussed above, a given storage device is visible to the given node when the given node has a functioning path to the given storage device (and not visible when the given node does not have a functioning path to the given storage device).

In some embodiments, the given node gathers data regarding the visibility of the storage devices 226, 234 to determine the visibility of the storage devices 226, 234 to the given node. The gathered data could include data from data logs, maintained by the storage devices 226, 234, which includes last updated functional status of the storage devices 226, 234. The functional status can be any information that indicates whether the storage devices 226, 234 are functioning normally. The gathered data could also include results from test runs to determine if the given node can store data in a given storage device, where a result of a successful test run indicates a functioning path between the given storage node and the given storage device. The above described gathered data are just some examples of data utilized by the given node to determine visibility of the storage devices 226, 234. There are other well-known methods and associated data that can be utilized by the given node to determine visibility of the storage devices 226, 234 and the gathered data utilized by the given node should not be limited to just those described above.

In some embodiments, the visibility of the given node can be defined in terms of various other parameters that are directly or indirectly related to the accessibility of the one or more storage devices 226, 234 that are directly or indirectly associated with the given node. For example, the visibility map associated with the given node, which is transmitted to the other active nodes, can include the given node's associated visibility in terms of the visibility of the storage shelves 220-1, 221-o to the given node. A given storage shelf is visible to the given node if a functioning data communication pathway exists between the given storage shelf and the given node, providing the one or more storage devices in the given storage shelf a working data communication pathway that can transfer data between components attached to the pathway.

Similarly, a given node's visibility can be defined in terms of various other parameters, e.g., whether one or more processors on storage shelves 220-1, 221-o which manage access to the storage devices 226, 234 associated with the storage shelves 220-1, 221-o are functioning, etc. As described above, the given node gathers data regarding the visibility of the storage shelves 220-1, 221-o to determine the visibility of the storage shelves 220-1, 221-o to the given node. The gathered data could include data from data logs, maintained by the storage shelves 220-1, 221-o, which includes last updated functional status of the storage shelves 220-1, 221-o. The functional status can be any information that indicates whether the storage shelves 220-1, 221-o are functioning normally. There are other well-known methods and associated data that can be utilized by the given node to determine visibility of the storage shelves 220-1, 221-o, processors on storage shelves 220-1, 221-o, etc., and the gathered data utilized by the given node should not be limited to just those described above.

Turning briefly to FIG. 7B, FIG. 7B illustrates an example of a visibility map 710 associated with the given node that the given node can transmit to the other active nodes. The visibility map 710 includes, for example, the sysID of the given node associated with the map 710, a timestamp indicating when the visibility map 710 was generated, a Boolean value indicating whether the visibility map 710 is provided as part of MSP 500 (discussed in further detail below), the list of storage disks #1 through #N in the SSG and their corresponding visibility to the given node. Visibility map 710 is merely provided as an example to illustrate the kind of information included in the visibility map 710 and is not meant to limit the information that could be included in the visibility map 710 or the format such information could be presented in. For example, as discussed above, the visibility map 710 can include the list of storage shelves 220-1-220-n in the SSG and their corresponding visibility to the given node. In another example, the visibility map 710 can include the list of processors on each of the storage shelves 220-1-220-n in the SSG and their corresponding visibility to the given node.

Returning now at FIG. 5, block 510, the given node receives the visibility map 710 of the other active nodes of the node group 210. In some instances, the other active nodes provide their respective visibility map 710 in response to receiving the visibility map 710 of the given node with the Boolean value indicating that the map 710 was provided as part of MSP 500. The other active nodes provide their respective visibility map 710 after initiating the MSP 500 within their respective nodes if their MSP 500 was already not initiated before the map 710 from the given node was received. A process for determining when to initiate MSP 500 within a given active node and provide the corresponding visibility map 710 of the given active node to the other active nodes is described in further detail below relating to FIG. 6.

When the visibility map 710 of all the other active nodes of the node group 210 is not received by the given node within a predefined time period, the given node reinitiates the MSP 500 at block 501. At block 512, the given node aggregates the visibility maps 710 received from the other active nodes with its visibility map 710 and generates an aggregate visibility map 720 as illustrated in FIG. 7C.

Turning briefly to FIG. 7C, FIG. 7C illustrates an example of an aggregate visibility map 720 generated by the given node. The visibility map 720 can include the various storage disks #1 through #N in the SSG and their corresponding visibility to the active nodes (including the given node) of the node group 210, where a "1" indicates the storage disk is visible to the corresponding active node and a "0" indicates the storage disk is not visible to the corresponding active node. It should be noted that the aggregate visibility map 720 is merely provided as an example to illustrate the kind of information included in the aggregate visibility map 720 and is not meant to limit the information that could be included in the aggregate visibility map 720 or the format such information could be presented in.

Returning now to FIG. 5, at decision block 514, based on the aggregate visibility map 720 generated at block 512, the given node determines if its visibility is equal to the maximum visibility seen by any of the active nodes. In some embodiments, the visibility of the given node is the total sum of the visibility values (indicated as binary values) associated with the given node in the aggregate visibility map 720. For example, in FIG. 7C, node #1 has a visibility value of 4 for disks #1 through #4 while node #N has a visibility value of 1 for disks #1 through #4. If the given node determines that its visibility is less than the maximum visibility seen by any of the active nodes, then at decision block 526, the given node disables functions associated with master node, indicating that another active node is acting as the master node of the node group. The process 500 then continues at decision block 524.

If at decision block 514 the given node determines that its visibility is equal to the maximum visibility seen by any of the active nodes, then, at decision block 516 the given node determines if there are two or more active nodes with visibility equal to that of the maximum visibility as determined from the aggregate visibility map 720. As discussed above, in MSP 500, the active node with visibility (e.g., functioning paths) to the most number of storage devices 226 and 234 within the SSG is chosen as the master node. However, when two or more active nodes have the same maximum visibility, both nodes can equally function as the master node of the node group 210. As discussed above, a node group can have only one master node. To break the tie, the sysID of the active nodes with the maximum visibility is compared to determine which active node should act as the master node.

At decision block 518, the given node determines if its sysID value is the lowest of the active nodes with maximum visibility. As discussed earlier, sysIDs includes numerical values that can be compared with one another. In various embodiments, the active node with the lowest sysID value acts as the master node and the rest of the active nodes with maximum visibility stop contending to be master nodes. If the given node does not have the lowest sysID value, then, the process 500 continues at block 526, where the given node disables functions associated with master node, indicating that another active node is designated as the master node of the node group 210.

If the given node has the lowest sysID value at decision block 518, then, at block 520, the given node enables functions associated with master node in itself, indicating that the given node is designated as the master node of the node group 210. The process 500 then continues at block 522, where the given node then notifies the other active nodes that the given node is to be designated as the master node of the node group 210. The process then continues at decision block 524, where the given node determines whether to reinitiate MSP 500 to determine if the given node should be designated as the master node. When the determination at decision block 524 prompts the given node to reinitiate MSP 500, the given node returns to block 502 and reinitiates MSP 500.

Figure 6:
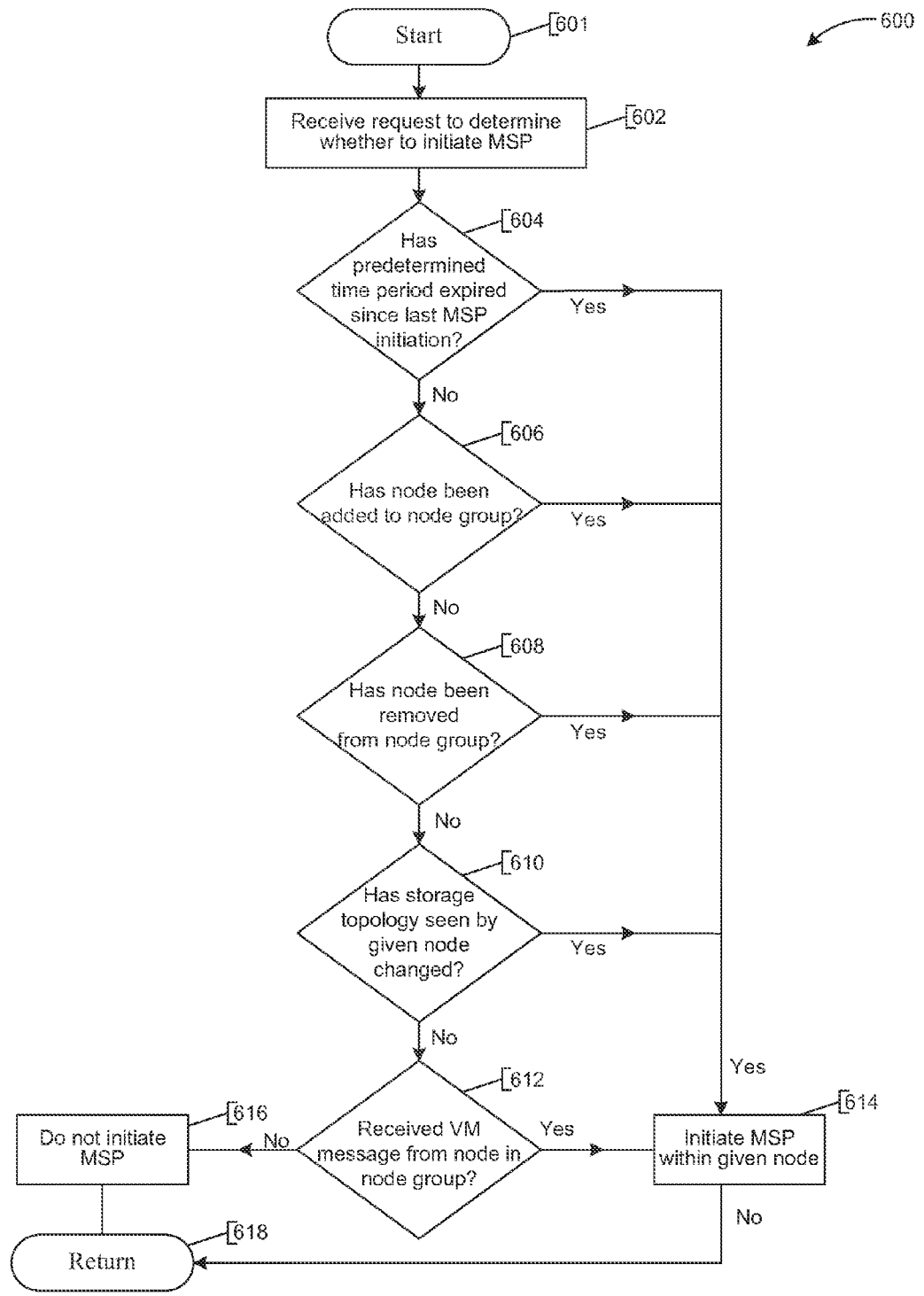
FIG. 6 is a flow diagram illustrating a process implemented by the active nodes of the node group to determine when to initiate master node selection process consistent with various embodiments.

FIG. 6 is a flow diagram illustrating a process implemented by the active nodes of the node group to determine when to initiate master node selection process consistent with various embodiments. In various embodiments, the process 600 can be implemented in each of the nodes of the node group 210. The process 600 beings at block 601. At block 602, a given node receives a request to determine whether to initiate MSP 500. Such a request can be received from, for example, process 500 executing on the given node. At block 604, the given node determines whether a predetermined time period has expired since the last MSP 500 initiation. When the predetermined time period has expired, at step 614, the given node initiates MSP 500. Reinitiating MSP 500 after expiration of predetermined time period ensures that the node best suited to be designated as the master node is chosen based on the latest visibility map.

At decision block 606, the given node determines if a new active node has been included in the given node's node group 210. The given node initiates MSP 500 when a new active node is included in the given node's node group 210. In various embodiments, the QMM informs the active nodes of a given node group when a new active node (e.g., when a previously booting node finally becomes active) is added to in the given node's node group. Reinitiating MSP 500 after a new active node is included in the given node's node group ensures that each active node designates the new active node as the master node when the new active node's visibility is better than the previously included active nodes. At decision block 608, the given node determines if an active node was removed from the given node's node group 210. The given node initiates MSP 500 when an active node was removed from the given node's node group 210. In various embodiments, the QMM informs the remaining active nodes of a given node group when an active node previously included in the given node group fails (e.g., when a previously functional node fails).

At decision block 610, the given node initiates MSP 500 when its storage topology has changed. The given node's storage topology includes information regarding the visibility of the various storage devices 226 and 234 and any change in visibility of the various storage devices 226 and 234 results from a change in storage topology of the given node. In various embodiments, the given node analyzes the visibility information included in the storage topology to determine whether to initiate MSP 500. For example, if failure of a data communication link, e.g., link 236, results in reduced visibility for the given node, the MSP 500 can be initiated to determine the node acting as the master node based on the reduced visibility map of the given node. At decision block 612, the given node initiates MSP 500 when the given node receives a visibility map 710 from a different node with a Boolean value indicating that the other node has initiated MSP 500 to identify the node designated as the master node. If none of the conditions analyzed in steps 604 through 612 is true, then at block 616, the given node does not initiate MSP 500. The process 600 then returns at block 618.

Thus, in the storage system 200, by initiating the MSP 500 and the other associated processes within each node of a given node group, each node can independently determine which node is acting as the master node without requiring any complex arbitration schemes amongst the nodes of the node group to determine their master node.

The foregoing description has been directed to specific embodiments of this invention. It will be apparent, however, that other variations and modifications may be made to the described embodiments, with the attainment of some or all of their advantages. For instance, it is expressly contemplated that these techniques can be implemented as software, including a computer-readable medium or a computer-readable storage medium having program instructions executing on a computer, hardware, firmware, or a combination thereof. Furthermore, it should be noted that while portions of this description have been written in terms of a storage system utilizing specific hardware and software, the teachings of the technique introduced here are not so limited. The technique introduced here can be utilized with any kind of storage devices. Accordingly this description is to be taken only by way of example and not to otherwise limit the scope of the invention. Therefore, it is the object of the claims to cover all such variations and modifications as come within the true spirit and scope of the invention.

What is claimed is:

1. A method of selecting a master node of a node group in a storage system, comprising:
   gathering data regarding visibility of one or more storage devices of the storage system to one or more active nodes of the node group, wherein a storage device of the one or more storage devices is visible to a selected active node of the one or more active nodes when the storage device is accessible to the active node through at least one functioning data communications path in the storage system;
   determining a maximum visibility value for the node group, wherein a visibility value of the selected active node is determined as a function of a total number of storage devices visible to the selected active node; and
   selecting as the master node of the node group an active node having the maximum visibility value.

2. The method of claim 1, wherein selecting the active node further includes:
   identifying two or more active nodes with visibility value equal to the maximum visibility value, the maximum visibility value corresponding to a highest visibility value of one or more visibility values associated with the one or more active nodes;
   gathering a node identification number associated with each of the two or more identified active nodes; and
   selecting as the master node the active node having the lowest node identification number.

3. The method of claim 1, wherein the data regarding visibility of the one or more storage devices to the selected active node is gathered as a visibility map, wherein the visibility map includes a list of storage devices with their corresponding visibility status, wherein the visibility status indicates whether the storage device is visible to the selected active node.

4. The method of claim 1, wherein the maximum visibility value is equal to the highest visibility value.

5. The method of claim 1, wherein the visibility value of the selected active node is equal to the total number of storage devices visible to the selected active node.

6. The method of claim 1, wherein the selected node of the node group is a storage controller utilized to manage data stored within the storage system.

7. The method of claim 1, wherein a node of the node group is active when the node responds to data requests for at least a portion of the data stored within the storage system.

8. The method of claim 1, wherein a node of the node group is not considered active when the node is shut down.

9. The method of claim 1, wherein the storage device includes a hard disk drive or a solid state drive.

10. The method of claim 1, wherein the node identification number is a numerical value.

11. A system for selecting a master node of a node group in a storage system, comprising:
    a component associated with an active node of the node group, configured to identify one or more other active nodes of the node group, wherein a node of the node group is active when the node responds to data requests in association with at least a portion of the data stored within the storage system;
    a component configured to request a visibility map associated with each of the one or more other active nodes of the node group;
    a component configured to receive the visibility map associated with each of the one or more other active nodes of the node group;
    a component configured to gather a visibility map associated with the active node;
    a component configured to determine a maximum visibility value for the node group, the maximum visibility value determined as a function of a highest visibility value of one or more visibility values corresponding to the one or more active nodes, wherein a visibility value of the given active node is determined as a function of a total number of storage devices visible to the given active node; and
    a component configured to select as the master node of the node group one of the active nodes of the node group with visibility value equal to the maximum visibility value.

12. The system of claim 11, further comprising:
    a component configured to identify two or more active nodes with associated visibility value equal to the maximum visibility value;
    a component configured to gather a node identification number associated with each of the two or more identified active nodes;
    a component configured to identify the active node from the two or more identified active nodes, the selected active node having the lowest node identification number of the two or more identified active nodes; and
    a component configured to select the identified active node as the master node of the node group.

13. The system of claim 11, wherein a visibility value of the given active node is determined based on the visibility map associated with the given active node, wherein the visibility map associated with a given active node includes a list of one or more storage devices in the storage system and a visibility of the one or more storage devices to the given active node, wherein a given storage device is visible to the given active node when the given storage device remains accessible to the given active node through at least one functioning path in the storage system, wherein the maximum visibility value is equal to the highest visibility value.

14. The system of claim 11, wherein the visibility value of the given active node is equal to the total number of storage devices visible to the given active node.

15. The system of claim 11, wherein a given node of the node group is a storage controller utilized to manage data stored within the storage system.

16. The system of claim 11, wherein a given node of the node group is not considered active when the given node is shutdown.

17. The system of claim 11, wherein the storage device includes a hard disk drive or a solid state drive.

18. The system of claim 11, where the node identification number is a numerical value.

19. A computer-readable storage device storing computer executable instructions, comprising:
    instructions for gathering data regarding visibility of one or more storage devices of the storage system to one or more active nodes of the node group, wherein a storage device of the one or more storage devices is visible to an active node of the one or more active nodes when the storage device remains accessible to the active node through at least one functioning data communication path in the storage system;
    instructions for determining a maximum visibility value for the node group, the maximum visibility value corresponding to a highest visibility value of one or more visibility values associated with the one or more active nodes, wherein the visibility value of the active node is determined as a function of a total number of storage devices visible to the active node; and
    instructions for selecting as the master node of the node group an active node with the maximum visibility value.

20. The computer-readable storage device of claim 19, further comprising:
    instructions for identifying two or more active nodes with visibility value equal to the maximum visibility value;
    instructions for gathering a node identification number associated with each of the two or more identified active nodes;
    instructions for identifying the active node from the two or more identified active nodes, the identified active node having the lowest node identification number of the two or more identified active nodes; and
    instructions for selecting the identified active node as the master node of the node group.

21. The computer-readable storage device of claim 19, wherein the data regarding visibility of the one or more storage devices to the active node is gathered as a visibility map, wherein the visibility map includes a list of storage devices with their corresponding visibility status, wherein the visibility status indicates whether the storage device is visible to the active node.

22. The computer-readable storage device of claim 19, wherein the maximum visibility value is equal to the highest visibility value.

23. The computer-readable storage device of claim 19, wherein the visibility value of the active node is equal to the total number of storage devices visible to the active node.

24. The computer-readable storage device of claim 19, wherein a node of the node group is a storage controller utilized to manage data stored within the storage system.

25. The computer-readable storage device of claim 19, wherein a node of the node group is active when the node responds to data requests for at least a portion of the data stored within the storage system.

26. The computer-readable storage device of claim 19, wherein a node of the node group is not considered active when the node is shut down.

27. The computer-readable storage device of claim 19, wherein the storage device includes a hard disk drive or a solid state drive.

28. The computer-readable storage device of claim 19, where the node identification number is a numerical value.

* * * * *